March 25, 1924.
J. M. RICH
LOW PRESSURE ALARM
Filed May 2, 1923
1,487,887
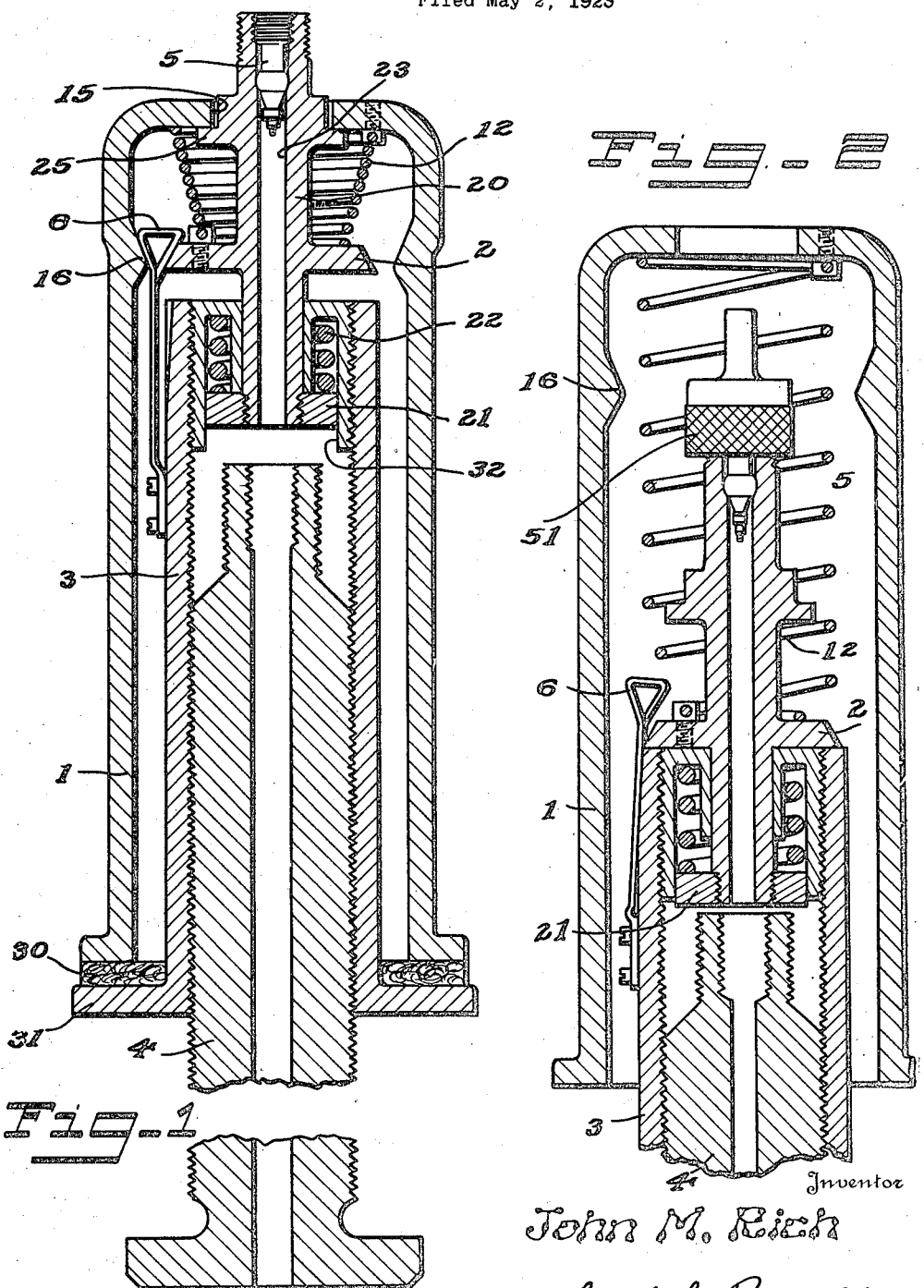
Inventor
John M. Rich
By H. L. & S. L. Reynolds
Attorneys Patented Mar. 25, 1924.

1,487,887

UNITED STATES PATENT OFFICE.

JOHN M. RICH, OF SEATTLE, WASHINGTON.

LOW-PRESSURE ALARM.

Application filed May 2, 1923. Serial No. 636,152.

*To all whom it may concern:*

Be it known that I, JOHN M. RICH, a citizen of the United States of America, and resident of the city of Seattle, in the county of King and State of Washington, have invented certain new and useful Improvements in Low-Pressure Alarms, of which the following is a specification.

My invention relates to an alarm which is intended to be applied to the valve stem of the ordinary pneumatic tire and which will produce an alarm or signal when the pressure within the tire falls below that which is deemed essential.

The principal object of my invention is to provide such an alarm which at the proper time will certainly and clearly produce a signal sounding continuously as long as the deflated condition persists, which occupies but small space, and which will not be affected or rendered inoperative by water, mud, dust or the like, with which it must come in contact.

A further object is the production of such an alarm which will be simple and cheap to manufacture, which is inconspicuous when applied, and which in operation is simple and reliable.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is a section through a tire valve stem and through my device as applied thereto, parts being shown in their normal position, with normal pressure.

Figure 2 is a similar section showing parts in position for giving the alarm, the pressure being below normal.

Essentially my device comprises a sleeve, which may take the form of a dust cap, and which is supported directly or indirectly from the valve stem in such a way that normally it is immobile relative to the valve stem, but which, when the pressure within the valve stem and tire falls below the predetermined minimum, will be rendered mobile relative to the valve stem, and by its vibration, while the vehicle is moving, will produce a rattling or tinkling sound which will be heard by the driver and understood to mean that the tire is becoming deflated.

The valve stem 4 is of any ordinary or usual construction. The dust cap 1 is secured to this valve stem in some suitable manner, as by the means which I shall proceed to describe, in such a way that normally it is immobile relative to the valve stem 4. To this end end I may provide a sleeve 3 which screws upon the valve stem and to a certain degree constitutes an extension thereof. The sleeve 3 may also act as a support for a lock 2, this lock including a stem 20 which is supported in the sleeve 3 for movement exially thereof, and which is movable likewise relative to the dust cap 1.

The stem 20 has formed thereon a piston 21 movable within a cylinder 32 forming a part of or secured in the sleeve 3. A spring 22 urges the piston 21 and the attached parts downward in opposition to pressures within the valve stem 4 and the tire, the tire not being shown herein. It will be understood that the usual removable valve is not inserted within the bore of the valve stem 4 when my invention is employed in connection therewith, but it may be inserted within a bore 23 formed within the stem 20. The removable valve is indicated at 5 and may be suitably protected, as is shown in Figure 2, by a valve cap 51. Preferably the stem 20 extends upwardly through an aperture 15 in the end of the dust cap 1, the opening being closed normally by a shoulder 25 upon the stem 20. In this position the upper end of the stem 20 is accessible for inflating the tire without disturbance of my device.

In order to maintain the dust cap 1 immobile relative to the valve stem 4, I have provided a catch 6. This I have shown as supported from the sleeve 3, although the manner of its support is immaterial. The catch itself may be of any suitable design, the intention being to hold the cap 1 relative to the lock 2 forming a part of the stem 20 so long as the lock 2 and stem 20 lie in their normal position, with the spring 22 under stress. As shown herein, however, the catch 6 is provided with two opposed inclined surfaces, one of which engages an incline 16 upon the interior of the cap 1, and the other of which engages the inclined edge of the lock 2.

A light spring 12 is secured between the cap 1 and the lock 2 for convenience, although it may be secured to any other member which is supported from the valve stem 4. Normally it is under stress, but upon release of the catch 6 from the dust cap 1 the spring 12 is released and moves the dust cap relative to the valve stem 4. Thereafter it prevents entire separation of the dust cap from the remainder of the device, and resiliently and yieldingly supports the dust cap so that it may move considerably relative to the other members. By this movement the tinkling or rattling sound is produced.

With parts in the position shown in Figure 1 the springs 12 and 22 are under stress. The spring 22 resists the pressures within the valve stem 4 which serve to thrust the stem 20 and lock 2 upward. The catch 6, of which several may be provided, being interposed between the incline 16 and the lock 2, prevents upward movement of the lock 2 and stem 20, and also prevents upward movement of the dust cap 1, forcing it firmly down upon the shoulder 25 and upon a yieldable washer 30 which may be provided between the lower end of the dust cap 1 and the flange 31 upon the sleeve 3. In this position, as noted above, air can be introduced to the valve stem 4 past the valve 5 without disturbing the alarm.

If pressure within the valve stem 4 falls below the predetermined minimum, the spring 22 will force the plunger 21 and the attached stem 20 and lock 2 downward. This permits inward movement of the catch 6, this being resiliently supported, and finally permits disengagement of the catch 6 and the incline 16. The spring 12 immediately acts to move the dust cap 1 upwardly until it takes the position shown in Figure 2. In this position the rattle of the cap as it strikes against the sleeve 3 will attract the attention of the driver.

Parts can be reset into their normal position by pressing downward the dust cap 1, as would naturally be done in applying a hose to the upper end of the stem 20 to reinflate the tire. As the pressure within the valve stem 4 overcomes the spring 22, the lock 2 will be moved upward until it reaches the position shown in Figure 1, where parts are locked.

What I claim as my invention is:

1. A low pressure alarm for tire valve stems comprising a dust-cap, means for holding said cap to the valve stem, a release for said holding means operable at pressures below a predetermined minimum, and resilient yieldable means for loosely supporting said cap from the valve stem after operation of such release.

2. A low pressure alarm for tire valve stems comprising a dust-cap, means for holding said cap to the valve stem, a release for said holding means operable at pressures below a predetermined minimum, and a coil spring having one end secured to said cap and its other end secured to the valve stem, and normally being under stress, and operable to loosely support the cap from the valve stem after release of the holding means.

3. A low pressure alarm for tire valve stems comprising a dust-cap, means for securing said cap to the valve stem, means operable to hold said cap normally immobile relative to the valve stem, and means operable upon decrease of pressure below a predetermined minimum to release said holding means, to permit ready movement of the cap relative to the valve stem.

4. A low pressure alarm for tire valve stems comprising a dust-cap, means for securing said cap to the valve stem, means operable to hold said cap normally immobile relative to the valve stem, and means operable upon decrease of pressure below a predetermined minimum to release said holding means, to permit ready movement of the cap relative to the valve stem, and a bored and valved stem adapted to pass through said cap, and communicating with the interior of said valve stem.

5. A low pressure alarm for tire valve stems comprising a dust cap, a stem within said cap, and slidable relative to the cap and to the valve stem, means for supporting said stem from the valve stem, a spring acting to move said stem in opposition to pressures within the valve stem, a releasable lock carried by said movable stem, a catch for normally holding said cap immobile relative to the valve stem, and engageable normally by said lock, said lock and stem being operable under the influence of said spring to release said catch upon decrease of pressure below a predetermined minimum, and resilient and yieldable means for loosely supporting the cap from the valve stem after release of said catch.

6. A low pressure alarm for tire valve stems including a sleeve normally immobile relative to the valve stem, and means operable upon decrease of pressure within the valve stem below a predetermined minimum to loosely support said sleeve from the valve stem, to permit continuous relative movement of the cap and valve stem.

Signed at Seattle, King County, Washington, this 24th day of April 1923.

JOHN M. RICH.